(12) United States Patent
Nava

(10) Patent No.: US 6,884,841 B2
(45) Date of Patent: Apr. 26, 2005

(54) LOW MONOMER CONTAINING LAMINATING RESIN COMPOSITIONS

(75) Inventor: Hildeberto Nava, Research Triangle Park, NC (US)

(73) Assignee: Reichhold, Inc., Research Triangle Park, NC (US)

( * ) Notice: Subject to any disclaimer, the term of this patent is extended or adjusted under 35 U.S.C. 154(b) by 0 days.

(21) Appl. No.: 10/771,053

(22) Filed: Feb. 3, 2004

(65) Prior Publication Data

US 2004/0170850 A1 Sep. 2, 2004

Related U.S. Application Data

(63) Continuation of application No. 08/683,682, filed on Jul. 17, 1996, now abandoned.
(60) Provisional application No. 60/017,028, filed on May 7, 1996.

(51) Int. Cl.$^7$ .............................. C08L 9/00; C08L 63/10; C08L 67/06
(52) U.S. Cl. ............................... 525/44; 525/48; 525/49; 525/177; 525/438; 525/502; 525/529; 525/531; 525/533
(58) Field of Search .............................. 525/44, 48, 49, 525/165, 438, 529, 531, 533, 922, 177, 502

(56) References Cited

U.S. PATENT DOCUMENTS

| | | |
|---|---|---|
| 3,825,517 A | 7/1974 | Ficarra ...................... 260/40 R |
| 4,163,093 A | 7/1979 | Hess et al. ................... 528/301 |
| 4,269,745 A | 5/1981 | Neumann ................. 260/23 P |
| 4,348,499 A | 9/1982 | Nelson ......................... 525/49 |
| 4,367,314 A | 1/1983 | Kageyama et al. .......... 525/168 |
| 4,465,806 A | 8/1984 | Lee .............................. 525/31 |
| 4,503,200 A | 3/1985 | Corley ....................... 525/532 |
| 4,544,725 A | 10/1985 | Priola et al. ................ 526/301 |
| 4,546,142 A | 10/1985 | Walewski ................... 524/487 |
| 4,559,375 A | 12/1985 | Schols et al. ............... 523/449 |
| 4,579,890 A | 4/1986 | Domeier ..................... 523/512 |
| 4,609,693 A | 9/1986 | Schols et al. ............... 523/465 |
| 4,619,953 A | 10/1986 | Schols et al. ............... 532/465 |
| 4,753,982 A | 6/1988 | Hefner, Jr. ................... 525/31 |
| 4,782,100 A | 11/1988 | Iwamoto et al. ............ 522/120 |
| 4,916,023 A | 4/1990 | Kawabata et al. .......... 428/482 |
| 5,069,581 A | 12/1991 | Kistner et al. ........... 405/259.6 |
| 5,084,353 A | 1/1992 | Cobbledick et al. ........ 428/413 |
| 5,194,334 A | 3/1993 | Uerdingen et al. ......... 428/416 |
| 5,202,366 A | 4/1993 | Reid et al. .................. 523/516 |
| 5,288,767 A | 2/1994 | Cramer et al. .............. 521/147 |
| 5,369,201 A | 11/1994 | Smeal et al. ................ 526/273 |
| 5,380,775 A | 1/1995 | Cowley et al. ............. 524/109 |
| 5,393,830 A | 2/1995 | Smeal et al. .................. 525/44 |
| 5,492,668 A | 2/1996 | Smeal et al. ................ 264/308 |
| 5,501,830 A | 3/1996 | Smeal et al. ................ 264/308 |

FOREIGN PATENT DOCUMENTS

| | | | |
|---|---|---|---|
| CA | 2102378 | 5/1994 | |
| DE | 42 38 536 A1 | 5/1994 | .......... C08L/67/06 |
| EP | 0 222 539 A2 | 5/1987 | .......... C08L/67/06 |
| FR | 0 555 117 A1 | 8/1993 | ......... C08F/220/20 |
| WO | 94/09068 | 4/1994 | .......... C08L/63/02 |

OTHER PUBLICATIONS

Jaspers et al.; "Diacryl, A New High Performance, Styrene Free Vinyl Ester Resin" 35$^{th}$ *Annual Technical Conference, Reinforced Plastics Composites Institute, The Society of Plastics Industry, Inc.* Section 10F 1–7 (1980).

Arco Chemical Company Product Safety Bulletin; "Styrene Monomer" Section2. "Occupational Health" (1994).

Lee et al. *Epoxy Resin Handbook* pp. 5.18 through 5.23 (1982).

*Primary Examiner*—Robert Sellers
(74) *Attorney, Agent, or Firm*—Myers Bigel Sibley & Sajovec, P.A.

(57) ABSTRACT

A laminating resin composition is disclosed which comprises an unsaturated polyester resin, a vinyl ester resin, a polyfunctional acrylate, and up to about 15 percent by weight of a vinyl monomer. Preferably, the vinyl ester resin has a molecular weight ranging from about 450 to 1500.

8 Claims, No Drawings

LOW MONOMER CONTAINING LAMINATING RESIN COMPOSITIONS

CROSS-REFERENCE TO RELATED APPLICATIONS

This application is a continuation application of U.S. patent application No. 08/683,682; filed Jul. 17, 1996, now abandoned which claims priority to U.S. Provisional Application Ser. No. 60/017,028, filed on May 7, 1996, the disclosures of which are incorporated herein by reference in their entireties.

FIELD OF THE INVENTION

The present invention relates to laminating resins. More particularly, the present invention relates to laminating resins having a low volatile monomer content.

BACKGROUND OF THE INVENTION

Laminating resins have long been used in conjunction with solid materials, typically those which are thermoset or thermoplastic materials which are reinforced by fibers. Typically, the resins are coated, sprayed, or brushed onto components which are used as panels forming the exterior bodies of vehicles, marine vessels, and other molded articles. Subsequently, the component is subjected to specified conditions such as temperature so as to cure the resin. The laminated resin is useful in that it imparts desirable physical properties to the panel. In particular, the cured resin typically displays adequate strength, toughness, elongation, heat distortion temperature, and chemical resistance properties. Moreover, the resin is desirable in that it provides a finished appearance to the exterior body.

A traditional laminating resin is typically formed from several components including unsaturated polyesters and bisphenol compounds such as difunctional bisphenol-A acrylic esters. The resin also typically includes a volatile monomer diluent such as styrene or vinyl toluene to facilitate employing the resin as a liquid.

The use of volatile monomers, however, have become disfavored due to alleged increased environmental risks. For example, U.S. Pat. No. 5,393,830 to Smeal et al. proposes a laminating resin which employs a reduced amount of styrene so as to meet a specified volatile emission test standard. The resin comprises a polyester resin, ethylene glycol dimethacrylate, vinyl toluene, cyclohexyl methacrylate, and bisphenol-A dimethacrylate.

The use of bisphenol-A dimethacrylate in a laminating resin, however, suffers from various drawbacks. For example, utilizing the bisphenol compound in forming a laminating resin is unduly complex from a processing standpoint in that multiple lengthy steps are needed before achieving the final resin end product. Moreover, the bisphenol-A dimethacrylate material is often one of the more expensive components used in formulating the laminating resin.

In view of the above, it is an object of the present invention to provide a laminating resin composition which utilizes a reduced level of volatile monomer diluent such as styrene.

It is a further object of the present invention to provide a laminating resin exhibiting good end properties which employs relatively less expensive starting material and is produced from a simpler process relative to conventional processes.

SUMMARY OF THE INVENTION

To these ends and others, the present invention provides a laminating resin which has low volatile monomer content and exhibits advantageous physical properties, especially with respect to toughness. Specifically, the laminating resin comprises an unsaturated polyester resin, a vinyl ester resin, a polyfunctional acrylate, and less than about 15 percent by weight of vinyl monomer.

The unsaturated polyester resin preferably has a weight average molecular weight ranging from about 300 to 2000. In such an embodiment, the laminating resin further comprises a component selected from the group consisting of acrylic acid, methacrylic acid, cinnamyl alcohol, crotonic acid, cinnamic acid, sorbic acid, maleic acid, fumaric acid, itaconic acid, benzoic acid, benzyl alcohol, cyclohexanol, 2-ethyl hexanol, trimethylol propane diallyl ether, and mixtures thereof.

The vinyl ester resin preferably has a weight average molecular weight ranging from about 450 to 1500 and is the reaction product of an unsaturated polycarboxylic acid or anhydride with an epoxy resin.

The laminating resin may optionally contain other components. In one embodiment, the laminating resin further comprises a dicyclopentadiene resin.

In a preferred embodiment, the laminating resin comprises from about 25 to 50 percent by weight of an unsaturated polyester resin, from about 1 to 75 percent by weight of a vinyl ester resin, from about 1 to 15 percent by weight of a polyfunctional acrylate, less than about 15 percent by weight of a vinyl monomer, and from about 5 to 25 percent by weight of a dicyclopentadiene resin.

The invention also relates to an article of manufacture. The article of manufacture comprises a substrate comprising reinforcing fibrous material and a laminating resin coated onto the substrate. The laminating resin comprises an unsaturated polyester resin, a vinyl ester resin, a polyfunctional acrylate, and less than about 15 percent by weight of a vinyl monomer.

DETAILED DESCRIPTION OF THE PREFERRED EMBODIMENTS

As summarized above, the present invention relates to a laminating resin which includes an unsaturated polyester resin, a vinyl ester resin, a polyfunctional acrylate, and less than about 15 percent by weight of a vinyl monomer. For the purposes of the invention, the term "laminating resin" is to be broadly interpreted to include any resin which may be applied to or coated on a suitable substrate. Laminating resins, for example, may include gel coat resins.

The unsaturated polyester resin is typically formed from the reaction between a polybasic acid or anhydride and an alcohol. Known and suitable processes for preparing such polyesters may be employed for the purpose of the present invention.

Suitable polybasic acids or anhydrides thereof include dicarboxylic acids such as, but not limited to, maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, malonic acid, alkenyl succinic acids such as n-dodecenylsuccinic acid, docecylcucinic acid and octadecenylsuccinic acid, and mixtures thereof. Lower alkyl esters of any of the above may also be employed.

The polybasic acid or anhydride may be employed in any suitable amount, preferably of from about 20 to 55 percent based on the weight of the unsaturated polyester resin.

Any alcohols which are appropriate in polyester-forming reactions are utilized. Such compounds include, but are not limited to, ethylene glycol, diethylene propylene glycol, diethylene glycol, neopentyl glycol, dipropylene glycol, poly-tetramethylene glycol, bispolyoxypropylene (2,2) -2,2-bis(4-hydroxyphenyl)propane, polyoxypropylene (3,3)-2,2-bis(4-bis(4-hydroxyphenyl) propane, polyoxyethylene(2,0)-2,2-bis(4-hydroxyphenyl)propane, polyoxypropylene(2,0)-polyoxyethylene(2,0)-2,2-bis(4-hydroxyphenyl)propane, and polyoxypropylene(6) -2,2-bis(4-hydroxyphenyl) propane. Diols may be employed and include, for example, 1,5-pentanediol, 1,4-butanediol, 1,6-hexanediol, 1,4-cyclohexanediol, and 1,4-cyclohexanedimethanol. Polyhydric alcohols are also suitable and include, for example, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methyl propanetriol, 2-methyl 1,2,4-butanetriol, trimethylol ethane, trimethylol propane, and 1,3,5-trihydroxyethyl benzene. Mixtures of any of the above may be used.

The alcohols may be employed in any suitable amount, preferably of from about 10 to 60 percent based on the weight of the unsaturated polyester resin.

Although not wishing to be bound by any theory, the molecular weight of the unsaturated polyester resin is believed to be controlled by end capping the polyester resin with a monovalent radical under known and suitable processing conditions. In this instance, the unsaturated polyester resin preferably has a weight average molecular weight ranging from about 300 to 2000, and more preferably from about 500 to 1000. The monovalent radical used to end cap the polyester resin may be selected from the group consisting of acrylic acid, methacrylic acid, cinnamyl alcohol, crotonic acid, cinnamic acid, sorbic acid, maleic acid, fumaric acid, itaconic acid, benzoic acid, benzyl alcohol, cyclohexanol, 2 ethylhexanol, and trimethylol propane diallyl ether. Mixtures of the above may be used. The monovalent radical is preferably employed in an amount ranging from about 20 to 60 percent based on the weight of the unsaturated polyester resin.

Known and appropriate esterification catalysts may be employed in the reaction which forms the unsaturated polyester resin. As an example, esterification catalysts may include organotin oxides and titanates such as stannous oxide, dibutyl tin oxide, dibutyl tin bis(ethylhexanoate), titanium isoproproxide, titanium ethoxide, and mixtures thereof. The catalysts may be employed in any suitable amount, preferably of from about 0.005 to 0.02 percent based on the weight of the polyester resin.

The laminating resin preferably employs from about 25 to 60 percent by weight of unsaturated polyester resin, more preferably from about 30 to 50 percent by weight, and most preferably from about 30 to 40 percent by weight.

The vinyl ester resin employed in the laminating resin is preferably of low molecular weight. The term "low molecular weight" refers to the vinyl ester resin preferably having a weight average molecular weight ranging from about 450 to 3000. Most preferably, the molecular weight ranges from about 500 to 1500. For the purposes of the invention, a vinyl ester resin typically includes a suitable reaction product of an unsaturated monocarboxylic acid or anhydride with an epoxy resin. The reactants are typically employed in amounts which provide a ratio of acid groups per epoxy group ranging from about 0.95:1 to about 1.05:1, with the ratio preferably being about 1:1. The reaction between the unsaturated monocarboxylic acid or anhydride and epoxy resin is typically carried out at temperatures ranging from about 90° C. to 130° C., preferably from about 100° C. to 120° C., and more preferably from about 105° C. to 110° C., for a sufficient time to complete the reaction. The reaction is usually considered complete when the percent acid remaining has reached a value of 1 or less. The reaction time is usually from about 3 to 6 hours.

Exemplary acids and anhydrides which may be used in forming the vinyl ester resins include (meth) acrylic acid or anhydride, α-phenylacrylic acid, α-chloroacrylic acid, crotonic acid, mono-methyl and mono-ethyl esters of maleic acid or fumaric acid, vinyl acetic acid, sorbic acid, cinnamic acid, and the like.

Epoxy resins which may be employed are known and include virtually any reaction product of a polyfunctional halohydrin, such as epichlorohydrin, with a phenol or polyhydric phenol. Suitable phenols or polyhydric phenols include, for example, resorcinol, tetraphenol ethane, and various bisphenols such as bisphenol-A, 4,4'-dihydroxydiphenylsulfone, 4,4'-dihydroxy biphenyl, 4,4'-dihydroxydiphenylmethane, 2,2'-dihydroxydiphenyloxide, and the like. In accordance with the invention, the amount of bisphenol-A is limited to quantities which are suitable.

Any appropriate epoxy resin may be used in forming the vinyl ester resin. The epoxy resins typically have an average of more than one vicinal epoxy group per molecule with an unsaturated polycarboxylic acid. Specific bisphenol epoxy resins employed in forming the vinyl ester resins are represented by the formula:

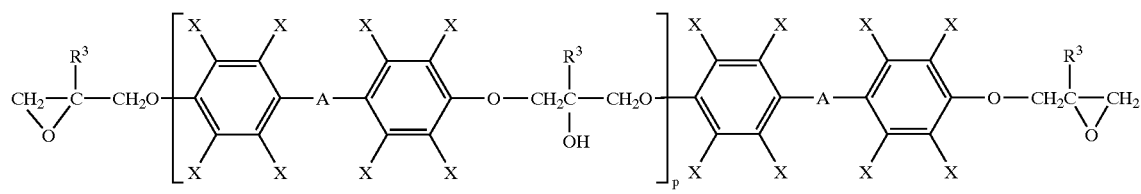

wherein X and A are defined herein; $R^3$ is H, —$CH_3$, or an alkyl from 1 to 4 carbon atoms; and p ranges from 0 to 15. Novolac epoxy resins may also be used and include those represented by the formula:

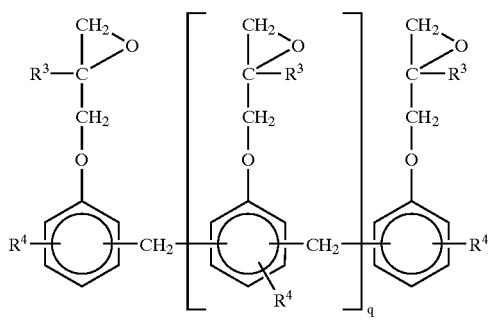

wherein $R^3$ is described herein; $R^4$ is H or an alkyl group; and q ranges from 1 to 15.

Specific epoxy compounds include various glycidyl ethers of resorcinol; catechol; hydroquinone; bisphenol A; fluorine, phenol-, or cresol-aldehyde resins and halogenated (e.g., bromine) substituted derivatives thereof. Mixtures of any of the above epoxy resins may be used.

A catalyst may be used for promoting the reaction between the unsaturated polycarboxylic acid or anhydride and the epoxy resin. Suitable catalysts include, for example, tris(dimethylamynomethyl)phenol, tetraethyl ammonium bromide, tetramethyl ammonium chloride, zirconium hexanoate, triphenyl phosphine, and the like. Any combination of the above may be used. Particularly suitable catalysts include, for example zirconium hexanoate or triphenyl phosphine, or any combination thereof and the like. The catalysts are usually employed in amounts of from about 0.03 to about 0.15, preferably from about 0.05 to 0.1, most preferably from about 0.06 part of catalyst per 100 parts of resultant mixture of the polycarboxylic acid or anhydride and the epoxy resin.

The laminating resin composition may be formed from various percentages of vinyl ester resin. Preferably, the laminating resin composition comprises between about 1 to 75 percent by weight of the vinyl ester resin, more preferably from about 1 to 70 percent by weight, and most preferably from about 5 to 40 percent by weight.

Any suitable polyfunctional acrylate may be used in the laminating resin composition, including those described, for example, in U.S. Pat. No. 4,916,023 to Kawabata et al., the disclosure of which is incorporated by reference herein in its entirety. Such compounds include ethylene glycol (EG) dimethacrylate, butanediol demethacrylate, hydroxypropyl methacrylate, hydroxyethyl methacrylate, and the like. The polyfunctional acrylate which may be used in the present invention can be represented by the general formula:

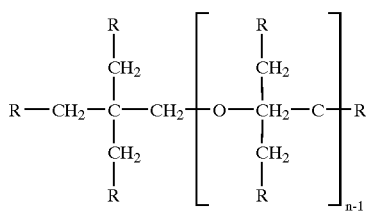

wherein at least four of the represented R's present are (meth)acryloxy groups, with the remainder of the R's being an organic group except (meth)acryloxy groups, and n is an integer from 1 to 5. Examples of polyfunctional acrylates include ethoxylated trimethyolpropane triacrylate, trimethyolpropane tri(meth)acrylate, trimethyolpropane triacrylate, trimethylolmethane tetra(meth)acrylate, pentaerythritol tetra (meth)acrylate, dipentaerythritol tetra(meth) acrylate, dipentaerythritol penta(meth)acrylate, and dipentaerythritol hexa (meth)acrylate. The preferred polyfunctional acrylate is EG dimethacrylate. Mixtures of any of the above may be used in the laminating resin.

The laminating resin composition may comprise various amounts of the polyfunctional acrylate. The laminating resin composition preferably comprises from about 1 to 15 percent by weight of the polyfunctional acrylate, and more preferably from about 3 to 10 percent by weight.

A vinyl monomer may also be included in the laminating resin composition, with the laminating resin containing less than about 15 percent by weight of the vinyl monomer. In accordance with the invention, such amounts of monomer are not believed to be hazardous. Using styrene as an example, one is referred to "Product Safety Bulletin: Styrene Monomer", *The Environmental, Health, and Safety Department of the Arco Chemical Company of Newtown Square, PA*, (March 1994). As known, the potential risk of any monomer depends on processing conditions relating to temperature, pressure, catalyst concentration, and monomer concentration. For example, OSHA has suggested an allowable 8 hours time weight average styrene exposure level of 50 ppm. Such monomers may include those such as, for example, styrene and styrene derivatives such as alpha-methylstyrene, p-methyl styrene, divinyl benzene, divinyl toluene, ethyl styrene, vinyl toluene, tert-butyl styrene, monochlorostyrene, dichlorostyrene, vinyl benzyl chloride, fluorostyrene, and alkoxystyrenes (e.g., paramethoxystyrene). Other monomers which may be used include, for example, diallyl phthalate, hexyl acrylate, octyl acrylate, octyl methacrylate, diallyl itaconate, diallyl meleate, hydroxyethyl acrylate, hydroxyethyl methacrylate, and hydroxypropyl methacrylate. Mixtures of the above may also be employed. The vinyl monomer more preferably comprises less than about 15 percent by weight of the laminating resin, and most preferably less than about 10 percent by weight of the laminating resin.

The laminating resin may also include other various components. For example, the resin may include dicyclopentadiene resin in any appropriate amount, preferably ranging from about 5 to 45 percent by weight of the laminating resin.

The laminating resin composition may include an agent such as an organic peroxide compound to facilitate curing of the composition. Exemplary organic peroxides may be used and include, for example, cumene hydroperoxide, methyl ethyl ketone peroxide, benzoyl peroxide, acetyl acetone peroxide, 2,5-dimethylhexane-2,5-dihydroperoxide, tert-butyl peroxybenzoate, di-tert-butyl perphthalate, dicumylperoxide, 2,5-dimethyl-2,5-bis(tert-butylperoxy) hexane, 2,5-dimethyl-2,5-bis (tert-butylperoxy) hexyne 3, bis (tert-butylperoxyisopropyl) benzene di-tert-butyl peroxide, 1,1-di (tert-amylperoxy)-cyclohexane, 1,1-di-(tert-butylperoxy)-3,3,5-trymethylcyclohexane, 1,1-di-(tert-butylperoxy)-cyclohexane, 2,2-di-(tert-butylperoxy)-butane, n-butyl 4,4-di-(tert-butylperoxy)-valerate, ethyl 3,3-di-(tert-amylperoxy)-butyrate, ethyl 3,3-di-(tert-butylperoxy)-butyrate and the like. Mixtures of any of the above may be used. The agent is preferably employed in an amount from about 1 to 2.5 percent based on the weight of the laminating resin, more preferably from about 1 to 1.5 percent by weight, and most preferably from about 1 to 1.25 percent by weight.

Suitable curing accelerators or promoters may also be used and include, for example, cobalt naphthanate, cobalt otoate, N,N-dimethyl aniline, N,N-dimethyl acetamide, and N,N-dimethyl para-toluidine. Mixtures of the above may be used. The curing accelerators or promoters are preferably employed in amounts from about 0.05 to 1.0 percent by weight, more preferably from about 0.1 to 0.5 percent by weight, and most preferably from about 0.1 to 0.3 percent by weight of the laminating resin.

Additional additives known by the skilled artisan may be employed in the laminating resin composition of the present invention including, for example, paraffins, fatty acids, fatty acid derivatives, lubricants, and shrink-reducing additives. Various percentages of these additives can be used in the laminating resin composition.

The present invention also relates to an article of manufacture. The article of manufacture may be any product which employs a laminating resin, and typically includes marine vessels, vehicles, and aircraft. More specifically, the article includes a substrate with the laminating resin composition coated thereon. The substrate may be made of any appropriate material and typically includes fibrous reinforced material such as those formed of thermoset or thermoplastic resins. The fibers which may be used typically include, but are not limited to, fibrous glass, carbon fibers, aromatic polyamide fibers, inorganic fibers, and the like.

The laminating resin composition may be prepared in accordance with any of the suitable processes known in the art and described further herein. The laminating resin composition may be applied by a suitable method such as coating (e.g., spraying or brushing) to the substrate so as to form a coat. Preferably, the thickness of the laminating resin coat ranges from about 0.2 to 3.0 mm. Coating operations are usually performed at temperatures ranging from about 10° C. to 35° C. The applied laminating resin and substrate is typically then cured using appropriate means at temperatures ranging from about 10° C. to 35° C. for about 1 to 120 minutes.

The following examples are provided to illustrate the present invention, and should not be construed as limiting thereof.

EXAMPLES 1–8

Preparation of Unsaturated Polyester and Vinyl Ester Resins

Examples 1 through 8 describe the unsaturated polyester and vinyl ester resins utilized in forming the laminating resins described in Examples A through H listed in Table 1. In Examples 1 through 8, the acid number of the resin refers to the number of milligrams of potassium hydroxide required to neutralize one gram of resin.

EXAMPLE 1

An unsaturated polyester resin containing dicyclopentadiene (DCPD) was prepared from 2.0 moles of maleic anhydride, 2.0 moles of DCPD and 1.0 moles of ethylene glycol. The resins is identified as Polylite® 44383 solid form available from Reichhold Chemicals, Inc., Research Triangle Park, N.C.

EXAMPLE 2

An unsaturated polyester resin containing DCPD was prepared from 2.0 moles of maleic anhydride, 2.2 moles of DCPD, 0.39 moles of diethylene glycol, and 0.19 moles of ethylene glycol. The resin is diluted in 25% styrene and has an acid number of 15, and a Brookfield viscosity of 600 cps at 25° C. The resin is identified as Polylite® 44006 available from Reichhold Chemicals, Inc.

EXAMPLE 3

A vinyl ester resin was prepared by reacting a diglycidyl ether of bisphenol-A having an epoxy equivalent weight of 180–190 with an acrylic acid in an equivalent ratio of acid per epoxy group of 1:1. The resin is identified as Epotuf® 91-275 available from Reichhold Chemicals, Inc.

EXAMPLE 4

An unsaturated polyester was prepared as follows. One mole of maleic anhydride and 1.08 mole of DCPD was mixed at a temperature of 100° C. At this temperature, 1.0 mole of water were added slowly at a rate such as the temperature of the reaction was maintained at about 125° C. Once all the water was added to the reactor and an acid number of about 220–230 was obtained, 1.0 mole of ethylene glycol and one mole of crotonic acid were added. The reaction was continued at 210° C. until an acid number of 22 was obtained. The final product had a Brookfield viscosity of 330 poise at 25° C.

EXAMPLE 5

An unsaturated polyester resin containing DCPD was prepared as follows. One mole of maleic anhydride and 1.08 moles of DCPD were reacted as in Example 4. Once an acid number of 220–230 was obtained, 1.0 moles of trimethylol propane diallyl ether together with 0.01% by weight of hydroquinone were added. The reaction was continued at 170° C. until an acid number of 31 was reached. The product obtained had a Brookfield viscosity of 29 poise.

EXAMPLE 6

An unsaturated polyester resin was prepared by reacting one mole of maleic anhydride with hydroxypropyl methacrylate in the presence of 0.01% by weight of toluhydroquinone (THQ) at 110° C. The reaction was stopped when an acid number of 220–230 was obtained. The product had a Brookfield viscosity of 9.8 poise.

EXAMPLE 7

An unsaturated polyester resin was prepared by reacting crotonic acid (9.5 mole) with ethylene glycol (10.5 mole) in the presence of dibutyl tin dilaurate (0.02% by weight) at 200° C. until an acid number of 5.0 was obtained. The temperature was then lowered to 100° C. and maleic anhydride (5.0 mole) followed by morpholine (0.15% by weight) were added. The reaction was continued at 210° C. until an ASTM Standard D-638; heat distortion was measured in accordance with ASTM Standard D-648; and water absorption was measured in accordance with ASTM Standard D-570.

TABLE 1

Laminating Resins (Examples A–H)

| Resin | A | B | C | D | Resin | E | F | G | H |
|---|---|---|---|---|---|---|---|---|---|
| 1 | | | | | 1 | 40.8 | | 23.3 | |
| 2 | | | | | 2 | | | | 13.0 |
| 3 | 70.0 | 40.0 | 40.0 | 70.0 | 3 | 27.2 | 60.0 | 15.6 | |
| 4 | | 40.0 | | | 4 | | | | |
| 5 | | | 40.0 | | 5 | | | | |
| 6 | | | | | 6 | | 20.0 | 10.2 | |
| 7 | | | | | 7 | | | 30.5 | |
| 8 | | | | | 8 | | | | 70.0 |
| Styrene | 15.0 | 10.0 | 10.0 | 15.0 | Styrene | | 10.0 | 10.2 | |
| EGDMA | | | | 10.0 | EGDMA | | | | |
| BuDMA | | 10.0 | 10.0 | | BuDMA | 15.0 | 10.0 | 10.2 | 10.0 |
| | | | | | Vinyl Toluene | | | | 7.0 |
| HPMA | 15.0 | | | 5.0 | HPMA | 5.0 | | | |
| Properties | | | | | Properties | | | | |
| Visc., cps., 25 C. | 880 | 1370 | 650 | 630 | Visc., cps., 25 C. | 970 | 1460 | 480 | 510 |
| Gel time, min | 13.0 | 23.0 | 53.0 | 26.0 | Gel time, min | 46.0 | 8.0 | 12.0 | 3.0 |
| Peak Exo., min. | 21.0 | 30.0 | 58.0 | 32.0 | Peak Exo., min. | 50.0 | 12.0 | 18.0 | 9.0 |
| Exotherm, C. | 164.0 | 139.0 | 143.0 | 165.0 | Exotherm, C. | 152.0 | 174.0 | 142.0 | 122 |
| 1162 Emission, g/m$_2$ | 46.0 | 21.0 | 31.0 | 45.0 | 1162 Emission, g/m$_2$ | 37.0 | 20.0 | 20.2 | 9.7 |
| Casting Properties | | | | | Casting Properties | | | | |
| Ten. Strength, psi | 9.775 | 8.470 | 8.270 | 11.302 | Ten. Strength, psi | 8.563 | 10.966 | 4.107 | 1.030 |
| Gen. Modulus, 10E5 psi | 5.40 | 5.30 | 4.63 | 5.63 | Ten. Modulus, 10E5 psi | 5.56 | 5.78 | 2.10 | 0.82 |
| Flex. strength, psi | 18.363 | 13.350 | 14.600 | 19.060 | Flex. strength, psi | 18.721 | 17.818 | 6.440 | 1.750 |
| Flex. Modulus, 10E5 psi | 5.20 | 5.08 | 4.53 | 5.71 | Flex. Modulus, 10E5 psi | 5.52 | 5.97 | 2.10 | 0.78 |
| Elongation, % | 2.30 | 2.00 | 2.50 | 2.70 | Elongation, % | 1.80 | 2.56 | 4.4 | 1.70 |
| Barcol Hardness | 42 | 40 | 40 | 45 | Barcol Hardness | 49 | 47 | 31.0 | 5.0 |
| Heat deflect. Temp., C. | 93 | 78 | 80 | 89 | Heat deflect. Temp., C. | 88 | 104 | 46.0 | 43.0 | acid number of 27 was reached. The product had a Brookfield viscosity of 3.6 poise at 25° C.

EXAMPLE 8

An unsaturated polyester resin was prepared by reacting crotonic acid (9.5 mole) with ethylene glycol (10.5 mole) in the presence of dibutyl tin dilaurate (0.02% by weight) at 200° C. until an acid number of 5.0 was obtained. The temperature was lowered to 100° C. and maleic anhydride (10.0 mole), ethylene glycol (5.0 mole), and morpholine (0.15% by weight) were added. The reaction was continued at 210° C. until an acid number of 17 was obtained. The product had a Brookfield viscosity of 89.3 poise at 25° C.

COMPARATIVE EXAMPLES A–L

Laminating Resins

Table 1 lists compositions and properties for various laminating resins (Examples A through H) of the present invention. Table 2 lists compositions and properties for various resins (Examples I through L) prepared according to U.S. Pat. No. 5,393,830 to Smeal et al. ("Smeal '830"). In the examples, resin tensile strength was measured in accordance with ASTM Standard D-638; flexural strength was measured in accordance with ASTM Standard D-79; barcol hardness was determined in accordance with ASTM Standard D-2583; elongation was measured in accordance with

TABLE 2

Laminating Resin Compositions According to Smeal '830

| Resin | I | J | K | L |
|---|---|---|---|---|
| BPA (2EO) DIACRYLATE | 100.00 | | 80.00 | |
| BPA (2EO) DIMETHACRYLATE | | 100.00 | | 80.00 |
| Styrene | | | 10.00 | 10.00 |
| BuDMA | | | 10.00 | 10.00 |
| Properties | | | | |
| Visc. cps. 25° C. | 900 | 920 | 103 | 110 |
| Gel Time, min. | 9.00 | 13.00 | 16.00 | 60.00 |
| Peak Exo., min. | 14.00 | 20.00 | 33.34 | 80.00 |
| Exotherm, ° C. | 169.00 | 165.00 | 141.00 | 162.00 |
| 1162 Emission, g/m$^2$ | 5.00 | 4.60 | 52.70 | 57.50 |
| Casting Properties | | | | |
| Ten. Strength, psi | 8170.00 | 8800.00 | 8200.00 | 8700.00 |
| Ten. Modulus, 10E5 psi | 4.33 | 3.90 | 4.42 | 4.00 |
| Flex. Strength, psi | 15000.0 | 13500.0 | 14400.00 | 14050.0 |
| Flex. Modulus, 10E5 psi | 4.02 | 3.64 | 4.13 | 3.70 |
| Elongation, % | 2.70 | 4.26 | 2.70 | 3.63 |
| Barcol Hardness | 39.00 | 40.00 | 41.00 | 44.00 |
| Heat Deflection Temp., C. | 64.00 | 79.00 | 71.00 | 91.00 |

The laminating resins prepared in accordance with the invention and Smeal '830 exhibit comparable properties with respect to strength, hardness, elongation, and heat deflection temperature.

In the specification, there have been disclosed typical preferred embodiments of the invention and, although specific terms are employed, they are used in a generic and descriptive sense only and not for purposes of limitation, the scope of the invention being set forth in the following claims.

What is claimed is:

1. A laminating resin composition comprising an unsaturated polyester resin which is formed from the reaction product of an polybasic acid or anhydride and an alcohol, a vinyl ester resin formed from the reaction product of an unsaturated monocarboxylic acid and an epoxy resin, having more than one vicinal epoxy group per molecule from about 1 to less than 15 percent by weight of a polyfunctional acrylate compound, and less than about 15 percent by weight of a vinyl monomer.

2. The laminating resin composition according to claim 1 wherein said unsaturated polyester resin has a weight average molecular weight ranging from about 300 to 2000.

3. The laminating resin composition according to claim 1 wherein said vinyl ester resin has a weight average molecular weight ranging from about 450 to 1500.

4. The laminating resin composition according to claim 1 wherein said polyfunctional acrylate is selected from the group consisting of ethylene glycol dimethacrylate, butanediol dimethacrylate, trimethylol propane trimethacrylate, and mixtures thereof.

5. The laminating resin composition according to claim 1 wherein said vinyl monomer is selected from the group consisting of styrene and vinyl toluene.

6. The laminating resin composition according to claim 1 further comprising a dicyclopentadiene resin.

7. The laminating resin composition according to claim 1 wherein the vinyl monomer comprises hydroxypropyl methacrylate.

8. The laminating resin composition according to claim 1 wherein said unsaturated polyester resin comprises a component selected from the group consisting of acrylic acid, methacrylic acid, cinnamyl alcohol, crotonic acid, cinnamic acid, sorbic acid, maleic acid, fumaric acid, itaconic acid, benzoic acid, benzyl alcohol, cyclohexanol, 2-ethyl hexanol, trimethylol propane diallyl ether, and mixtures thereof.

* * * * *